Dec. 29, 1931.   L. A. M. PHELAN   1,838,152
OSCILLATING ELECTRIC MOTOR
Filed April 1, 1927   3 Sheets-Sheet 1

Witness
Martin H. Olsen.

Inventor
Louis A. M. Phelan
By Jones, Addington, Ames & Seibold
Attys.

Dec. 29, 1931.   L. A. M. PHELAN   1,838,152
OSCILLATING ELECTRIC MOTOR
Filed April 1, 1927   3 Sheets-Sheet 2

Witness
Martin H. Olsen.

Inventor
Louis A. M. Phelan
By Jones, Addington, Ames & Seibold
Attys.

Dec. 29, 1931.   L. A. M. PHELAN   1,838,152
OSCILLATING ELECTRIC MOTOR
Filed April 1, 1927   3 Sheets-Sheet 3

Witness
Martin H. Olsen.

Inventor
Louis A. M. Phelan
By Jones, Addington, Ames & Seibold
Attys.

Patented Dec. 29, 1931

1,838,152

UNITED STATES PATENT OFFICE

LOUIS A. M. PHELAN, OF ELKHART, INDIANA, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

OSCILLATING ELECTRIC MOTOR

Application filed April 1, 1927. Serial No. 180,094.

This invention relates to electric flashers and has special reference to an electrically operated and controlled device for periodically making-and-breaking an electrical circuit in various types of electrical apparatus.

More particularly this invention relates to an electric flasher employing one or more fluid contact making-and-breaking members which are actuated by an electromagnet to control the electrical circuit therethrough and through a lamp or any other desirable load.

The various types of apparatus controlled by this invention are continuous in action, and therefore, it is desirable that the latter be designed so as to be durable, simple in operation, and require a minimum amount of electrical energy for its operation. Further, it is particularly desirable that the contact making-and-breaking members are capable of opening and closing an electrical circuit indefinitely without substantial deterioration and disintegration thereof or of the operating mechanism generally.
The device shown in this application comprises an unbalanced armature mounted on an armature shaft, which armature is operated by an electromagnet. One or more electrical switches, preferably of the tiltable fluid contact making-and-breaking type, are mounted on the armature shaft to control the supply of electrical energy through the electromagnet and the lamps or any other load which may be desired, the electromagnet actuating the armature to produce a rotation of the armature shaft, which latter controls the operation of the switches.

One of the objects of this invention is to provide an electric flasher which is simple in construction and durable.

Another object of this invention is to provide an electric flasher in which the length of flash may be readily adjusted.

A further object of this invention is to provide an electric flasher requiring a minimum of electrical energy for its operation.

A still further object of this invention is to provide an electric flasher which is self-starting upon receiving a supply of electrical energy therethrough.

It is also an object of this invention to provide an electric flasher which will operate substantially and without regard to the plane at which it is disposed and will tend to realign itself if caused to move out of position.

Further objects and advantages of this invention will be apparent from the following description and the accompanying drawings forming a part of this specification to which latter reference may be now had for a more complete understanding of the characteristic features of this invention, in which drawings.

Figure 1:
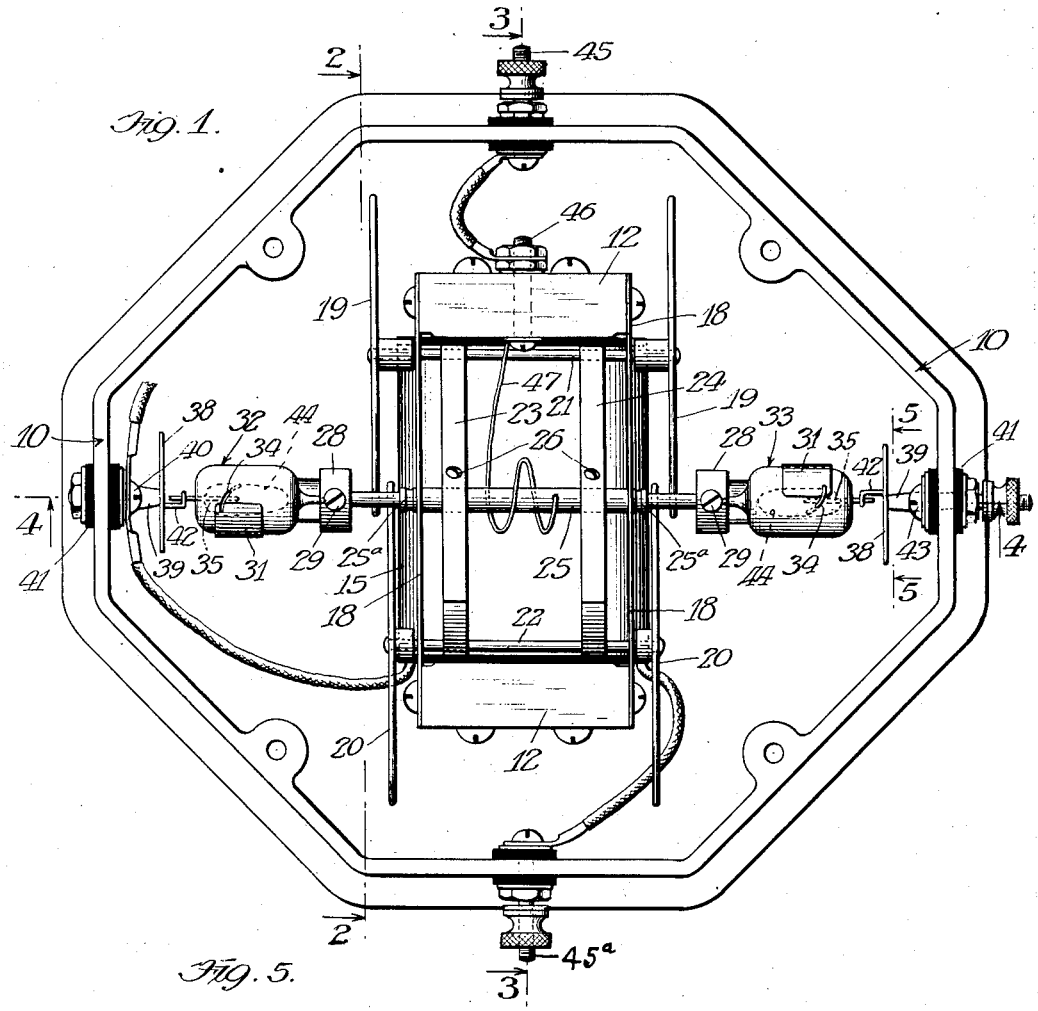
Figure 1 is a top plan view of the signal flasher.
Figure 5:
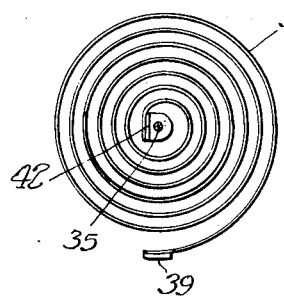
Fig. 5 is a detail view of the electrical connection between the terminal of the casing and the electrical switch.

Referring now to the drawings, the electric flasher comprises a housing 10 having a cover 11 suitably fastened to the top of the side walls thereof as by means of a screw extending through the cover and in threaded engagement with lugs cast integrally with the side walls. The housing is preferably cast of metal, although it is understood that the same may be stamped or formed of sheet metal or made of wood, composition or any other desirable substance. In this instance, the housing or container is formed into an octagonal shape to conform more or less to the outline of the mechanism contained therein, although it may be desirable to have this container shaped in a manner to conform with the apparatus with which it may be associated.

The operating mechanism of the electric flasher comprises an electromagnet substantially of the horseshoe type having a pair of spaced iron upright members 12 between which is suitably mounted a soft iron core 13. A pair of screws 14 extend through the upright members 12 and threadedly engage the core 13 to hold the same in a fixed relation with the upright members. A coil of wire 15 is wound around the iron core 13 and is suitably insulated from the iron uprights 12 as by means of the mica or hard rubber discs 16. The iron uprights 12 are secured to the base of the housing 10 by means of screws 17 and are further supported and joined together by means of the end plates 18 which latter are suitably fixed thereto.

Two pair of intersecting supporting discs 19 and 20 are supported by the end plates 18, said discs 19 being fixedly mounted to a shaft 21 and said discs 20 being fixedly mounted to a shaft 22, both of which shafts are rotatably mounted in the end plates 18.

A pair of unbalanced armatures 23 and 24 are mounted on an armature shaft 25 and are adjustably fixed thereto by means of the set screws 26. The armatures are preferably formed of soft iron, and the armature shaft is preferably composed of a metal such as brass or any other good electrical conducting material. The armature shaft 25 extends through enlarged openings in the end plates 18 and is supported on the peripheries and at the point of intersection of the intersecting discs 19 and 20. The shaft 25 is held against longitudinal movement by means of having its ends reduced whereby shoulders are formed as at 25$^a$ for abutting the peripheries of the discs 20. The armatures 23 and 24 are held in a biased or unbalanced position between the uprights 12 by means of counterweights 27 which are preferably formed integral therewith, each being formed at a position closer to one end thereof than to the other. By thus positioning the counterweights 27 off-center, the force of gravity will hold the elongated armatures in an unbalanced or biased position.

A pair of collars 28 are mounted on the ends of the armature shaft 25 and are adjustably fixed thereon by means of set screws 29. These collars are preferably formed of brass or some such suitable electrical conducting material and have brackets 30 fixed thereto, the ends of which brackets are formed into clips 31 for receiving and holding a pair of mercury tube contactors 32 and 33 in axial alignment with the armature shaft 25.

The mercury tube contactors 32 and 33 are of the same construction and a description of one will be identical with that of the other. The contactor 32 comprises a hermetically sealed glass container into which is disposed a pair of spaced cooperating electrodes 34 and 35, electrode 34 passing through a glass shank 36 of the container to be fastened on the outer side thereof to the clip 31, electrode 35 passing through glass shank 37 and extending a short distance out of the container. A current conducting spring 38 is secured at its outer end to a bracket 39 which latter bracket is secured to a terminal screw 40 extending through the housing 10 and insulated therefrom by means of insulating washers 41. The other end of the current conducting spring 38 is secured to a bracket 42 which is fixed to the outer end of the electrode 35. The other contactor tube 33 is connected through one end of a current conducting spring 38 and a bracket 39 to a terminal screw 43 which extends through the housing 10 and is insulated therefrom by means of insulating washers 41, the other end of said spring 38 being connected to a bracket 42 which is fixed to the outer end of electrode 35.

In the mercury tube contactor herein shown, it will be noted that the electrodes 34 and 35 are spaced transversely of the axis of the tube, this being for the reason that it is desired to operate the contactor tube by means of rotating the same or tilting the tube on its own center or axis. Heretofore, these mercury tubes, as far as is known to this applicant, have been moved or tilted about a center outside of itself. Each of the contactor tubes 32 and 33 are held in a fixed relation with the brackets 30 and their cooperating clips 31, said brackets and clips being fixed to the collars 28 which are adjustably fixed to the armature shaft 25, and therefore, the contactor tubes 32 and 33 are adjustable with respect to the armature shaft 25.

Figure 6:
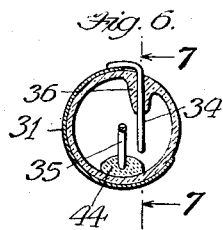
Fig. 6 is a transverse central sectional view of the switch member taken on the line 6—6 of Fig. 7;
Figure 7:
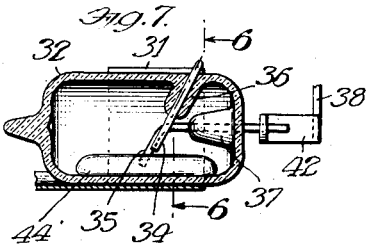
Fig. 7 is a longitudinal sectional view taken on the line 7—7 of Fig. 6.
Figure 2:
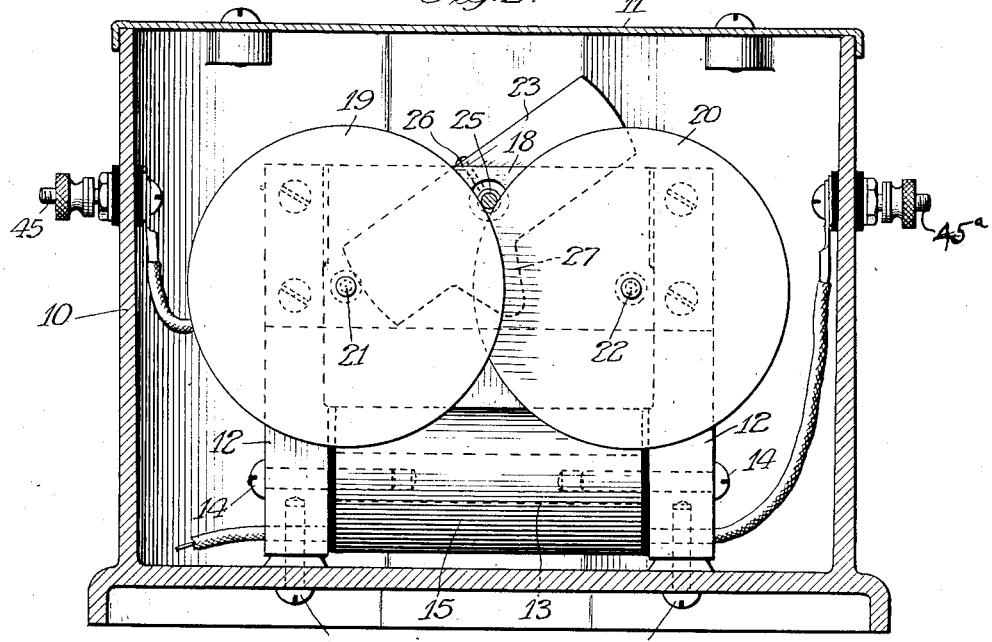
Fig. 2 is an end elevational view of the mechanism of the signal flasher showing the casing in section and being taken on the line 2—2 of Fig. 1;
Figure 3:
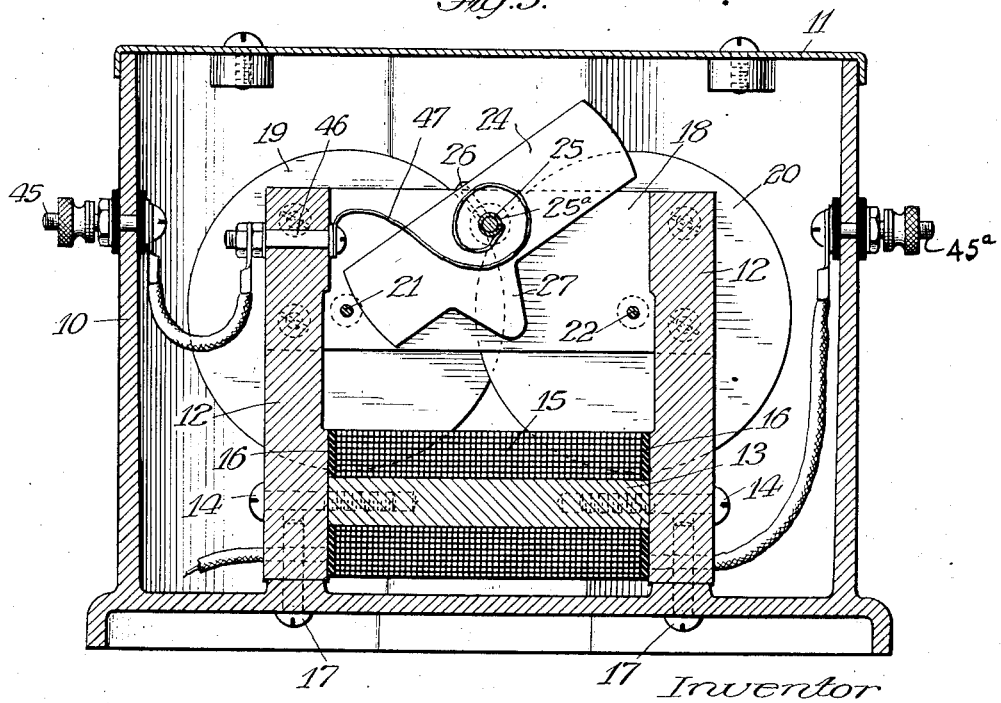
Fig. 3 is a transverse central sectional view taken on the line 3—3 of Fig. 1.
Figure 4:
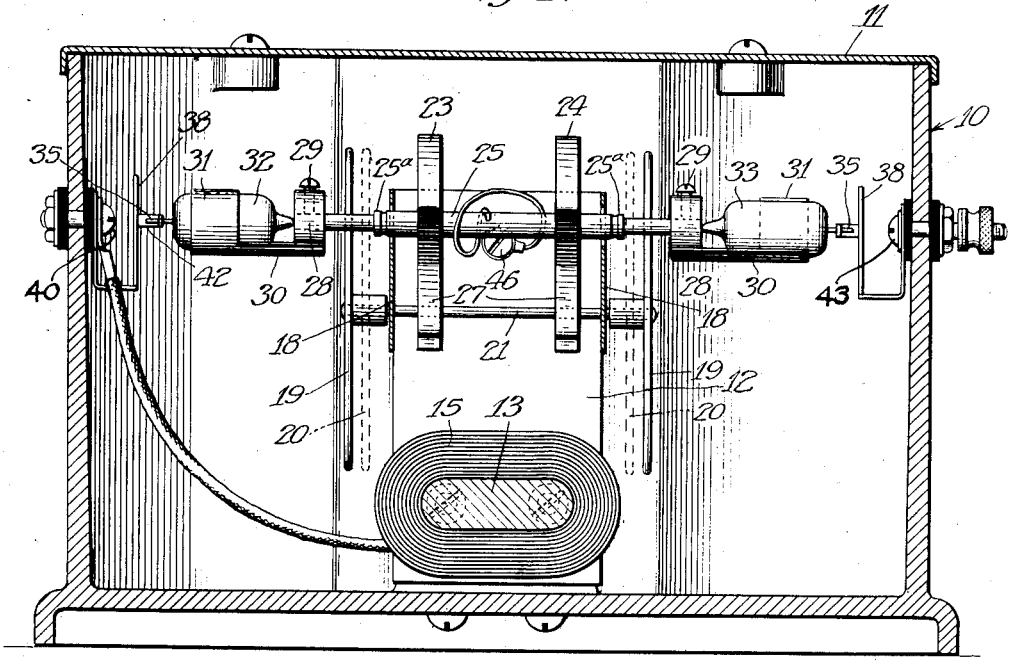
Fig. 4 is a longitudinal central sectional view taken on the line 4—4 of Fig. 1.

In the operation of the device thus far described, when the coil 15 is energized, the electromagnetic lines thread through the armature 23 and 24 and the latter are raised against the action of the weights 27 to a substantially horizontal position whereby the magnetic circuit is completed through the electromagnet. As the armatures are fixed to the shaft 25, this action rotates the latter and causes a rotation of the contactor tubes 32 and 33 in one direction. Upon the deenergization of the electromagnet, the weights 27 return to their original position to rotate the contactor tubes 32 and 33 in the opposite direction. The electrodes 34 and 35 are preferably so positioned in the container that a rotation in one direction will cause the mercury 44 to bridge the electrodes in one of the contactors thereby making an electrical circuit therethrough, while the mercury in the other contactor is caused to flow away from the electrodes to break the electrical circuit therethrough. By referring now to Fig. 6, it will be noted that the electrode 35 occupies a substantially central position in the contactor 32 and the electrode 34 is positioned to the right thereof. In the contactor 33 looking in the same direction as that in which Fig. 6 is taken, the electrode 34 should be positioned to the left of the electrode 35.

In order to determine the flash period or that length of time in which the mercury bridges the electrodes, it will be noted that by loosening the set screw 29 and rotating the collar 28 in one direction, a very slight flash period may be effected inasmuch as the mercury will have a comparatively great distance to travel before it contacts with the second electrode to make an electrical circuit therethrough, whereas rotation of the collar 28 in the opposite direction will permit the mercury to contact with the second electrode with but a comparatively short distance of travel and will therefore bridge the electrodes for a considerably longer period of time. This adjustment may be very readily and conveniently made as may be the adjustment of the armatures on the armature shaft.

Figure 8:
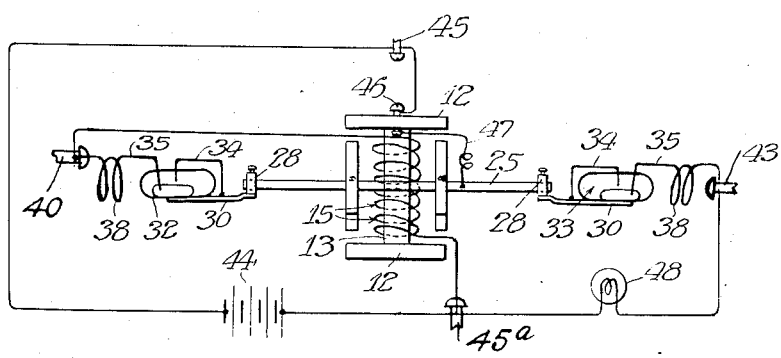
Fig. 8 is a wiring diagram of the electric flasher as connected to the battery and the load.

By referring now more particularly to Fig. 8, the electrical circuits through the flasher will now be traced. One side of the battery 44 is connected to the terminal 45, the other side thereof being connected to the terminal 45a. The terminal 45 is suitably insulated from the casing 10 and mounted thereon, said terminal 45 being connected to another terminal 46 mounted on the upright 12 of the electromagnet. The other end of the terminal 46, which latter projects through the upright 12, is connected by means of a flexible connection 47 to the armature shaft 25. The lamp or other load is connected between terminals 43 and 45a. It will be noted that in the illustration shown in the drawings, two mercury tube contactors have been shown, one of said contactors 32 controlling the electrical circuit through the coil 15 and the other contactor 33 controlling the circuit through the lamp or other load. Assuming that the contactor 32 is in a position such that the mercury bridges the electrodes 34 and 35, thus establishing an electrical circuit therethrough, the electrical current passes through the armature shaft 25 from the flexible lead 47 and thence through the clip 30, the electrodes of the contactor tube 32, the conducting spring 38, terminal 41 to the coil and back to the other side of the battery 44. As has been hereinbefore described, the energization of the coil 15, by means of the electrical circuit just recited, actuates the armatures 23 and 24 to rotate the shaft 25 which causes a rotation of the contactors 32 and 33 thereby breaking the electrical circuit through the tube 32 and establishing an electrical circuit through the contactor 33.

When the contactor 33 is in a closed circuit position, an electrical circuit is completed from the flexible lead 47 through the armature shaft 25 and thence through the bracket 30, the electrodes 34 and 35, the conducting spring 38 to the terminal 43, and through the lamp or other load 48 back to the other side of the battery. In short, when the contactor 32 is in a closed circuit position, one side of the battery 44 is connected to the armature shaft 25 and from thence through the coil 15 and back to the other side of the battery, thus energizing the coil. Should the contactor 33 be in a closed circuit position, one side of the battery 44 is connected through the shaft 25 and through the contactor 33 to the lamp 48 or other load and back to the other side of the battery.

However, in order to simplify the construction and to minimize the cost of manufacturing, it may be desirable to operate the electric flasher with but a single mercury contactor tube in a single electrical circuit. In this instance, the energization of the coil 15 and the operation of the lamp or other load will be obtained simultaneously. Although in some instances it may be practical, this is not particularly desirable, because of the heavy drag on the battery. It would seem that too much electrical energy would be taken from the battery at one time with the result that the lamp 48 would be somewhat dimmed. It does not seem necessary to make a showing of an electrical circuit that would incorporate this feature as it is quite apparent that the lamp 48 or other load could then be positioned in the line between the coil 15 and one side of the battery.

As a result of this invention, an electrical switch is obtained whereby the switching means thereof is operated by and directly supported on an actuating element which is in the path of an electromagnet. By mounting the switching means so that its longitudinal axis coincides with the axis of rotation of the actuating element, the linkage mechanism which has heretofore been necessary between the actuating element and the switch is eliminated and thereby a minimum of electrical current is required for the operation of the device. Further, by reason of normally holding the actuating element out of the magnetic path of the electromagnet, the device is self-starting upon receiving a supply of electrical energy therethrough. It will be particularly noted that the device will operate without substantial regard to the plane at which it is disposed whereby it will be unnecessary to provide for a final adjustment subsequent to its installation in an apparatus with which it is associated.

While but a single embodiment of this invention has been herein shown and described, it is obvious that many modifications thereof may occur to those skilled in the art without departing from the spirit and scope of this invention, and therefore, it is desired that the latter be limited only by the scope of the appended claims and the prior art.

I claim:

1. An apparatus of the character described comprising a support, a plurality of intersecting supporting discs mounted thereon, a shaft mounted on the peripheries of said supporting discs and at the points of intersection thereof, a rotatable switch member mounted on said shaft, means for actuating said shaft, said switch member being rotated to make-and-break an electrical circuit therethrough to control the operation of said actuating means.

2. In an electric flasher, a rotatable shaft, means for actuating said shaft, a contactor adjustably supported on said shaft and in axial alignment therewith, said contactor having a pair of spaced cooperating electrodes and a body of current-conducting fluid disposed therein to make-and-break an electrical circuit therethrough for controlling the operation of said actuating member, said electrodes being disposed transversely of the axis of said tube whereby a partial rotation of said shaft will cause said mercury to bridge or to flow away from said electrodes.

3. The combination with a mercury electric contactor and a member for supporting and rotating said contactor about the longitudinal axis thereof to make-and-break an electrical circuit therethrough, of means for rotating said member to control the operation of said electric contactor, said contactor being mounted so that the longitudinal axis thereof coincides with the axis of rotation of said member.

4. An apparatus of the character described comprising an actuating member, and a mercury tube contactor mounted thereon substantially coaxially therewith and actuated thereby, said contactor being rotated about its longitudinal axis to make-and-break an electrical circuit therethrough to control the operation of said actuating member.

5. An apparatus of the character described comprising a rotatably mounted shaft, an armature mounted thereon for the actuation thereof, means for actuating said armature, and a mercury tube contactor mounted on said shaft and actuated thereby, said contactor being rotated about its longitudinal axis to make-and-break an electrical circuit therethrough to control the operation of said armature actuating means.

6. An apparatus of the character described comprising an electromagnet, a rotatably mounted shaft, an armature fixedly mounted on said shaft actuated by said electromagnet and normally held out of the path of maximum strength thereof, and a mercury tube contactor mounted on said shaft and actuated thereby, said contactor being rotated about its longitudinal axis to make-and-break an electrical circuit therethrough to control the operation of said armature actuating means.

7. An apparatus of the character described comprising an electromagnet, a rotatably mounted shaft, an armature fixedly mounted on said shaft actuated by said electromagnet and normally held in a biased position relatively thereto, and a mercury tube contactor adjustably mounted on said shaft and actuated thereby, said contactor being rotated about its longitudinal axis to make-and-break an electrical circuit therethrough to control the operation of said armature actuating means.

In witness whereof, I have hereunto subscribed my name.

LOUIS A. M. PHELAN.